United States Patent
Okuno

(10) Patent No.: US 11,108,925 B2
(45) Date of Patent: Aug. 31, 2021

(54) MULTI-FUNCTION PERIPHERAL AND IMAGE RECORDING APPARATUS

(71) Applicant: Brother Kogyo Kabushiki Kaisha, Nagoya (JP)

(72) Inventor: Tetsuya Okuno, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/586,394

(22) Filed: Sep. 27, 2019

(65) Prior Publication Data

US 2020/0106901 A1 Apr. 2, 2020

(30) Foreign Application Priority Data

Sep. 28, 2018 (JP) .............................. JP2018-185216

(51) Int. Cl.
*H04N 1/00* (2006.01)
*G06F 3/12* (2006.01)
*H04N 1/32* (2006.01)

(52) U.S. Cl.
CPC ....... *H04N 1/00474* (2013.01); *G06F 3/1288* (2013.01); *G06F 3/1292* (2013.01); *H04N 1/00244* (2013.01); *H04N 1/00307* (2013.01); *H04N 1/32117* (2013.01); *H04N 2201/001* (2013.01)

(58) Field of Classification Search
CPC ........... H04N 1/00474; H04N 1/32117; H04N 1/00307; H04N 1/00244; H04N 2201/001; G06F 3/1292; G06F 3/1288

USPC ................................ 358/1.11–1.18, 400–404
See application file for complete search history.

(56) References Cited

U.S. PATENT DOCUMENTS

| | | | |
|---|---|---|---|
| 2013/0016392 A1* | 1/2013 | Lee | G06K 15/4005 358/1.15 |
| 2013/0083337 A1* | 4/2013 | Tecu | G06F 3/1204 358/1.13 |
| 2013/0194623 A1* | 8/2013 | Tecu | G06F 3/1292 358/1.15 |

(Continued)

FOREIGN PATENT DOCUMENTS

| | | |
|---|---|---|
| JP | 2004-030280 A | 1/2004 |
| JP | 2009-141472 A | 6/2009 |

(Continued)

*Primary Examiner* — Chad Dickerson
(74) *Attorney, Agent, or Firm* — Banner & Witcoff, Ltd.

(57) ABSTRACT

There is provided a multi-function peripheral including: a scanner; one of a printer and an image transmitting part; a data communicating part; and a controller. The controller is configured to execute: scanning of an object by controlling the scanner; obtaining of network information regarding communication which is performed by the data communicating part and terminal identification information as identification information of a mobile terminal, from image data generated by scanning, performed by the scanner, of an image as the object displayed on a display of the mobile terminal; and controlling of the data communicating part so as to transmit, based on the obtained network information, self-identification information which is identification information of the multi-function peripheral, as information addressed to a device having the obtained terminal identification information.

11 Claims, 12 Drawing Sheets

(56) References Cited

U.S. PATENT DOCUMENTS

| | | | | |
|---|---|---|---|---|
| 2013/0258390 A1* | 10/2013 | Suzuki | ............... | H04N 1/32776 |
| | | | | 358/1.14 |
| 2014/0240774 A1* | 8/2014 | Suzuki | .................. | G06F 3/1292 |
| | | | | 358/1.15 |
| 2019/0384537 A1* | 12/2019 | Arai | ....................... | G06F 3/1231 |
| 2020/0004479 A1* | 1/2020 | Aoki | .................. | H04N 1/00477 |

FOREIGN PATENT DOCUMENTS

| | | |
|---|---|---|
| JP | 2014-092831 A | 5/2014 |
| JP | 2015-106189 A | 6/2015 |
| JP | 2016-081082 A | 5/2016 |

\* cited by examiner

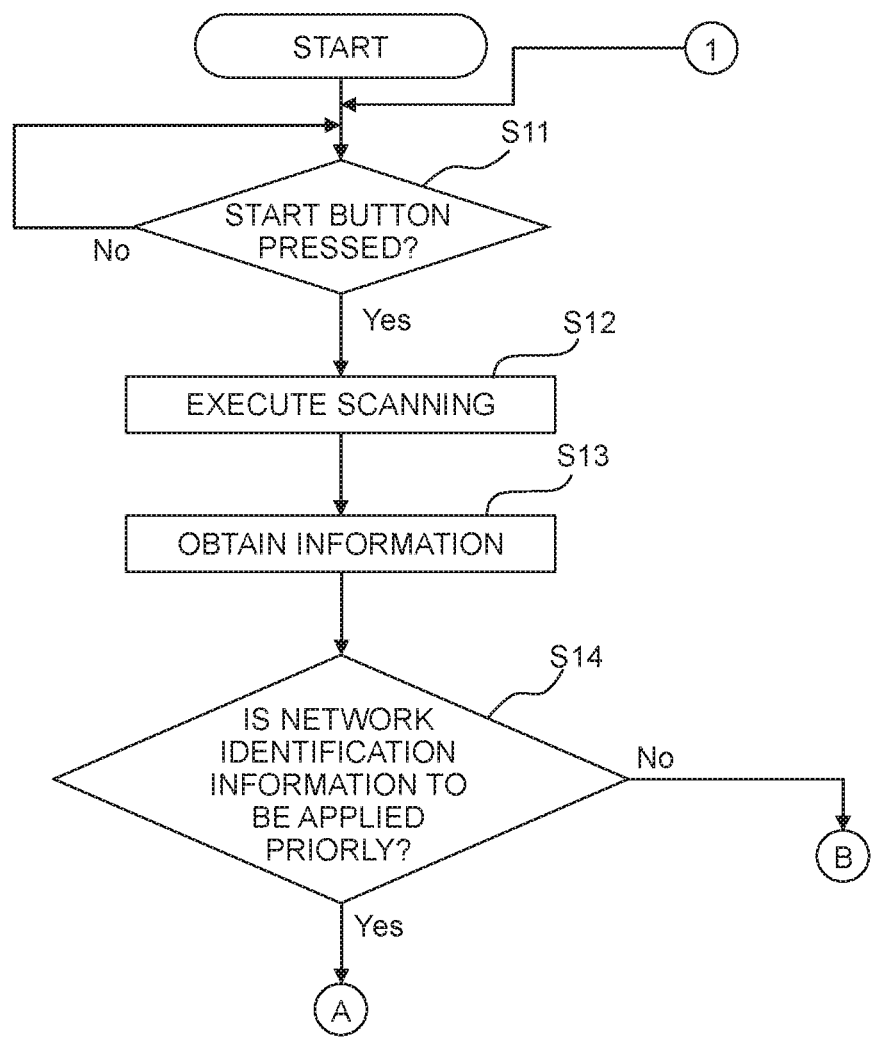

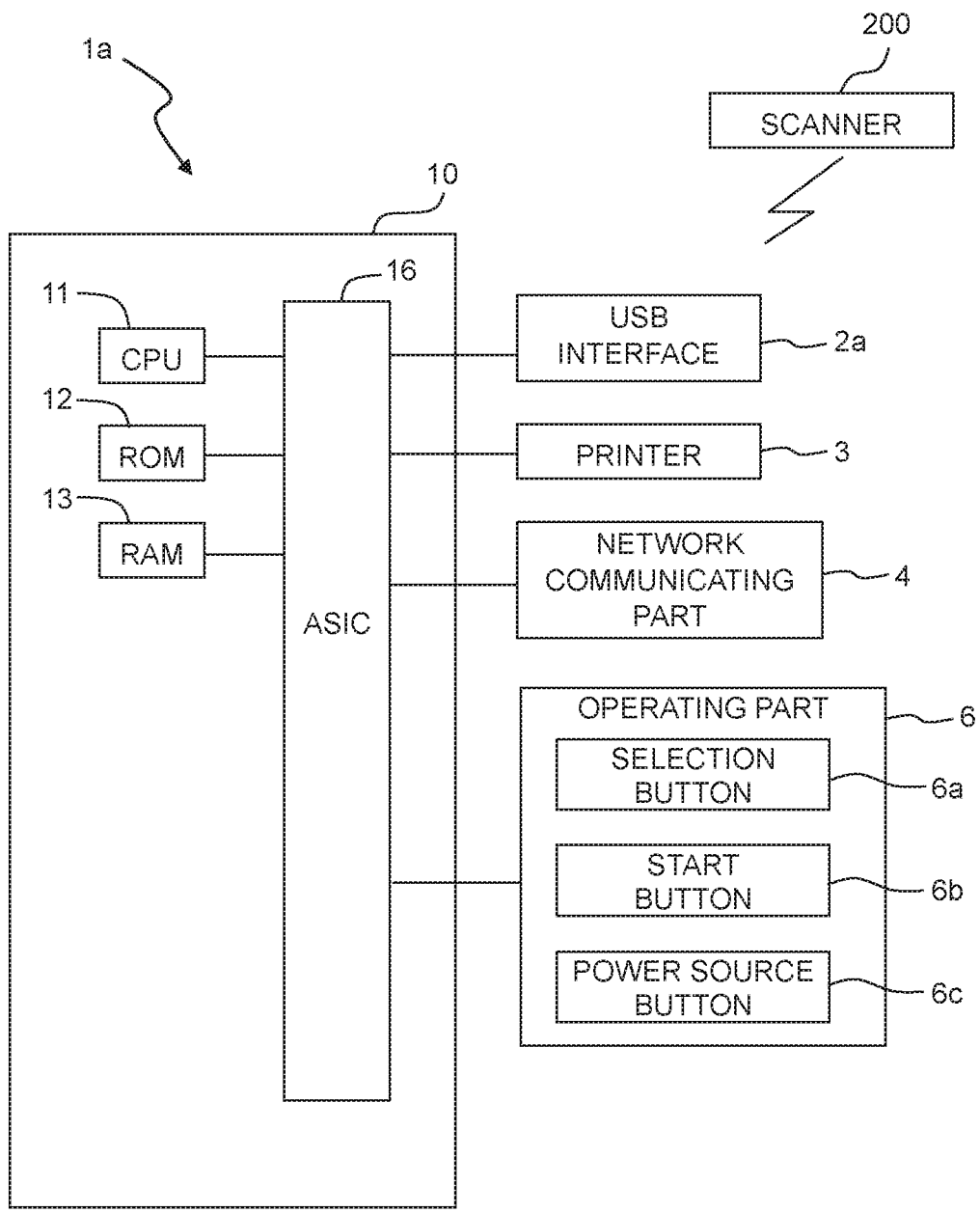

MULTI-FUNCTION PERIPHERAL AND IMAGE RECORDING APPARATUS

CROSS REFERENCE TO RELATED APPLICATION

The present application claims priority from Japanese Patent Application No. 2018-185216 filed on Sep. 28, 2018, the disclosures of which is incorporated herein by reference in its entirety.

BACKGROUND

Field of the Invention

The present disclosure relates to a multi-function peripheral and an image recording apparatus.

Description of the Related Art

As mobile terminals such as smartphones are widely used, there is a growing demand for operating a MFP (Multi-Function Peripheral) and a printer by using the mobile terminal. Conventionally, there is known a multi-function peripheral or printer capable of establishing a wireless communication directly with a mobile terminal via a wireless LAN (Local Area Network), without requiring any access point. In this case, a user may cause identification information and a password regarding the wireless communication of the multi-function peripheral or printer which is the host machine (for example, SSID (Service Set Identifier) to be displayed on a display of the multi-function peripheral or printer, and the user may input the password regarding the identification information to the mobile terminal.

Further, in such a case that the mobile terminal and the multi-function peripheral or printer belong to a same network, it is also publicly known to establish the wireless communication between the mobile terminal and the multi-function peripheral or printer via an access point. In a case that the multi-function peripheral or printer is provided with a display, it is possible to cause the display to display thereon the identification information and the password regarding the wireless communication regarding the network to which the multi-function peripheral or printer belongs, and further an IP address of the multi-function peripheral or printer itself. In this case, by inputting the password and the IP address to the mobile terminal, it is possible to establish the communication between the mobile terminal and the multi-function peripheral or printer, both of which belong to the same network, relatively easily.

SUMMARY

However, in such a case that a multi-function peripheral or printer is not provided with the display, it is not possible to display the identification information and the password regarding the wireless communication, and further it is not possible to display the IP address of the multi-function peripheral or printer itself. Thus, in either of case of the direct communication or the communication via the access point, it is not possible to easily establish the wireless communication between the multi-function peripheral or printer and the mobile terminal. Further, even in a case that the multi-function peripheral or printer and the mobile terminal are already connected to different networks, respectively, if the display is not provided on the multi-function peripheral or printer, it is not possible to display the identification information of the multi-function peripheral or printer for purpose of notifying the identification information of the multi-function peripheral or printer to the user of the mobile terminal, which in turn makes it difficult to transfer (delivery) the data between the multi-function peripheral or printer and the mobile terminal.

An object of the present disclosure is to provide a multi-function peripheral and an image recording apparatus which are operable by using a mobile terminal such that data can be transferred between the multi-function peripheral and the image recording apparatus, and the mobile terminal.

According to an aspect of the present disclosure, there is provided a multi-function peripheral including: a scanner of a flat-bed system; one of a printer and an image transmitting part, the printer being configured to record an image on a recording medium based on image data, the image transmitting part being configured to transmit the image data to a communication-destination apparatus; a data communicating part configured to perform data communication; and a controller. The controller is configured to: scan an object by controlling the scanner; obtain network information regarding communication which is performed by the data communicating part and terminal identification information as identification information of a mobile terminal, from image data generated by the scanning, performed by the scanner, of an image as the object displayed on a display of the mobile terminal; and control the data communicating part so as to transmit, based on the obtained network information, self-identification information which is identification information of the multi-function peripheral, as information addressed to a device having the obtained terminal identification information.

According to another aspect of the present disclosure, there is provided an image recording apparatus including: a printer configured to record an image on a recording medium based on image data; a connecting part connectable to a scanner of a flat-bed system; a data communicating part configured to perform data communication; and a controller. The controller is configured to: obtain network information regarding communication which is performed by the data communicating part and terminal identification information as identification information of a mobile terminal, from image data generated by scanning, performed by the scanner, of an image displayed on a display of the mobile terminal; and control the data communicating part so as to transmit, based on the obtained network information, self-identification information which is identification information of the image recording apparatus, as information addressed to a device having the obtained terminal identification information.

It is possible to obtain the network information regarding the communication which is performed by the data communicating part and the terminal identification information, by performing reading of the display of the mobile terminal such as a smartphone, with the scanner. Further, by performing, based on the obtained network information, transmittance of the self-identification information which is identification information of the multi-function peripheral or the image recording apparatus itself, it is possible to notify the mobile terminal of the self-identification information. Accordingly, even if the multi-function peripheral or the image recording apparatus has such a configuration that is not provided with the display, it is possible to easily establish the communication between the multi-function peripheral or the image recording apparatus and the mobile terminal or to easily transfer data between the multi-function peripheral or the image recording apparatus and the mobile terminal.

BRIEF DESCRIPTION OF THE DRAWINGS

FIGS. 6A and 6B depict a flowchart depicting an example of a processing procedure executed by a controller of the multi-function peripheral depicted in FIG. 1.

FIG. 8 is a block diagram schematically depicting the electric configuration of a printer according to a modification of the present disclosure.

DESCRIPTION OF THE EMBODIMENTS

In the following, a multi-function peripheral according to an embodiment of the present disclosure will be explained with reference to the drawings. The present embodiment relates to a Multi-Function Peripheral (MFP: hereinafter referred to as "multi-function peripheral") having the printing function, the scanner function and the facsimile (FAX) function.

Figure 1:
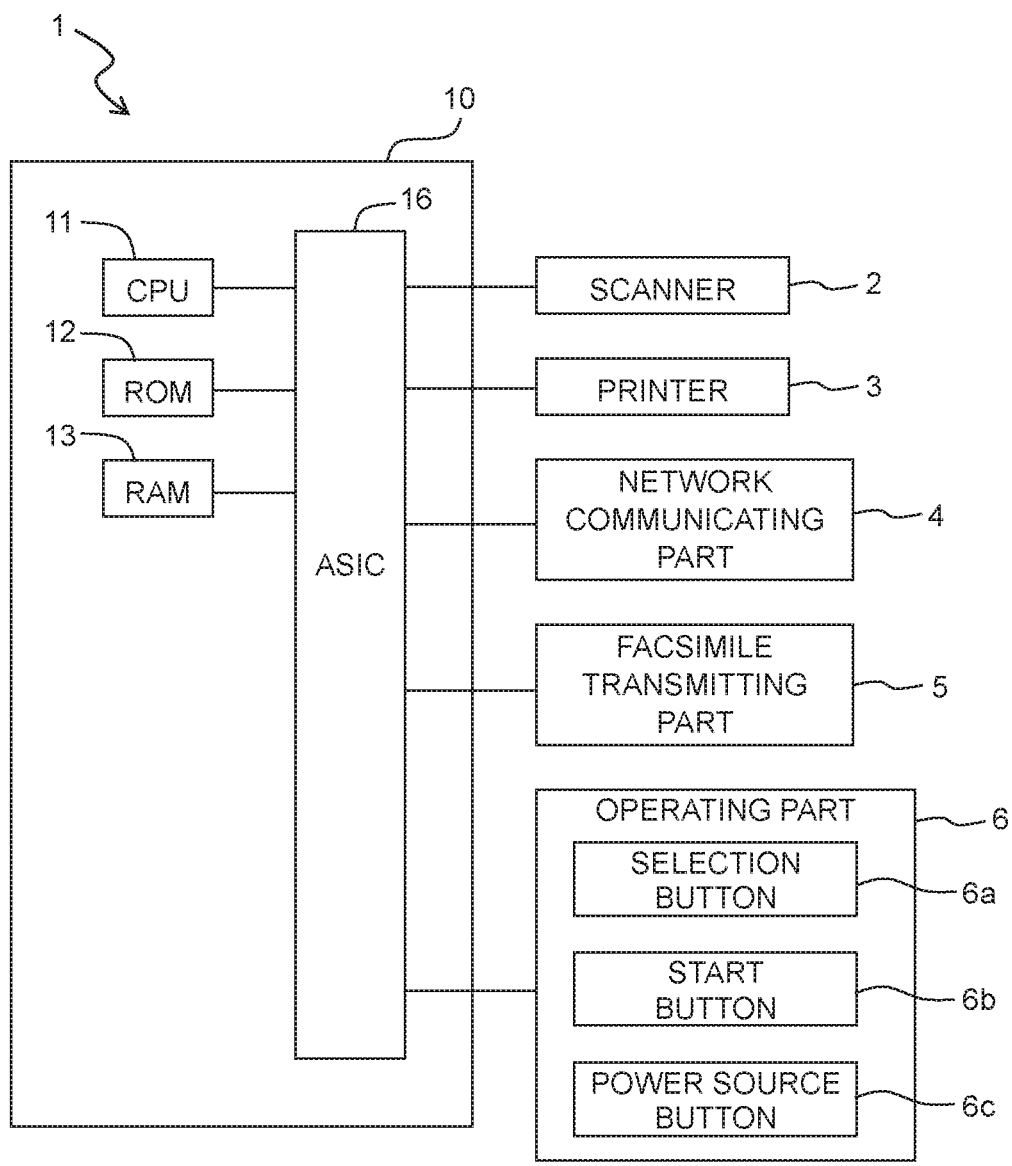
FIG. 1 is a block diagram schematically depicting the electric configuration of a multi-function peripheral according to an embodiment of the present disclosure.

As depicted in FIG. 1, the multi-function peripheral 1 is provided with a controller 10 including a CPU (Central Processing Unit) 11, a ROM (Read Only Memory) 12, a RAM (Random Access Memory) 13, an ASIC (Application Specific Integrated Circuit) 16. A scanner 2, a printer 3, a network communicating part 4, a facsimile communicating part 5 and an operating part 6 are connected to the ASIC 16. The controller 10 controls the multi-function peripheral 1 as a whole by causing the CPU 11, the ROM 12, the RAM 13 and the ASIC 16 to cooperate with one another. Note that any display is not provided on the multi-function peripheral 1 of the present embodiment.

Note that also FIG. 1 depicts one piece of the CPU 11 and one piece of the ASIC 16, the controller 10 may be configured such that the controller 10 includes only one piece of the CPU 11, and that the single CPU 11 solely performs a variety of kinds of necessary or required processing. Alternatively, the controller 10 may include a plurality of pieces of the CPU 11 and the CPUs 11 may perform the variety of kinds of necessary or required processing in sharing manner. Alternatively, the controller 10 may be configured such that the controller 10 includes only one piece of the ASIC 16, and that the single ASIC 16 solely performs a variety of kinds of necessary or required processing; or that the controller 10 includes a plurality of pieces of the ASIC 16 and that the ASICs 16 perform the variety of kinds of necessary or required processing in sharing manner.

The scanner 2 optically reads an original (manuscript) placed on a reading base (not depicted in the drawings) by using photoelectric conversion elements, such as CCD, CMOS, etc., to thereby prepare or generate image data. The printer 3 is configured to record an image, based on the image data, on a paper sheet (paper) in a predetermined system (for example, the laser system, ink-jet system, etc.).

The network part 4 is an interface configured to perform a wireless LAN communication. The wireless LAN communication of the present embodiment is, for example, a standard conforming to IEEE802.11b/g/n. As depicted with solid lines in FIG. 2, the network communicating part 4 establishes a wireless LAN connection with respect to an access point 21 to thereby enables the multi-function peripheral 1 to be connected to an internet 20 via a proxy server 22 connected to the access point 21. In this situation, in a case that the multi-function peripheral 1 has already obtained information regarding a server 23 connected to the internet 20 and URL (Uniform Resource Locator) of the server 23 as position information of the position of the server 23 on the internet 20, the multi-function peripheral 1 is capable of performing data communication with respect to the server 23. Note that a LAN 21a is constructed of one or plurality of devices (apparatuses) connected to the access point 21.

Figure 2:
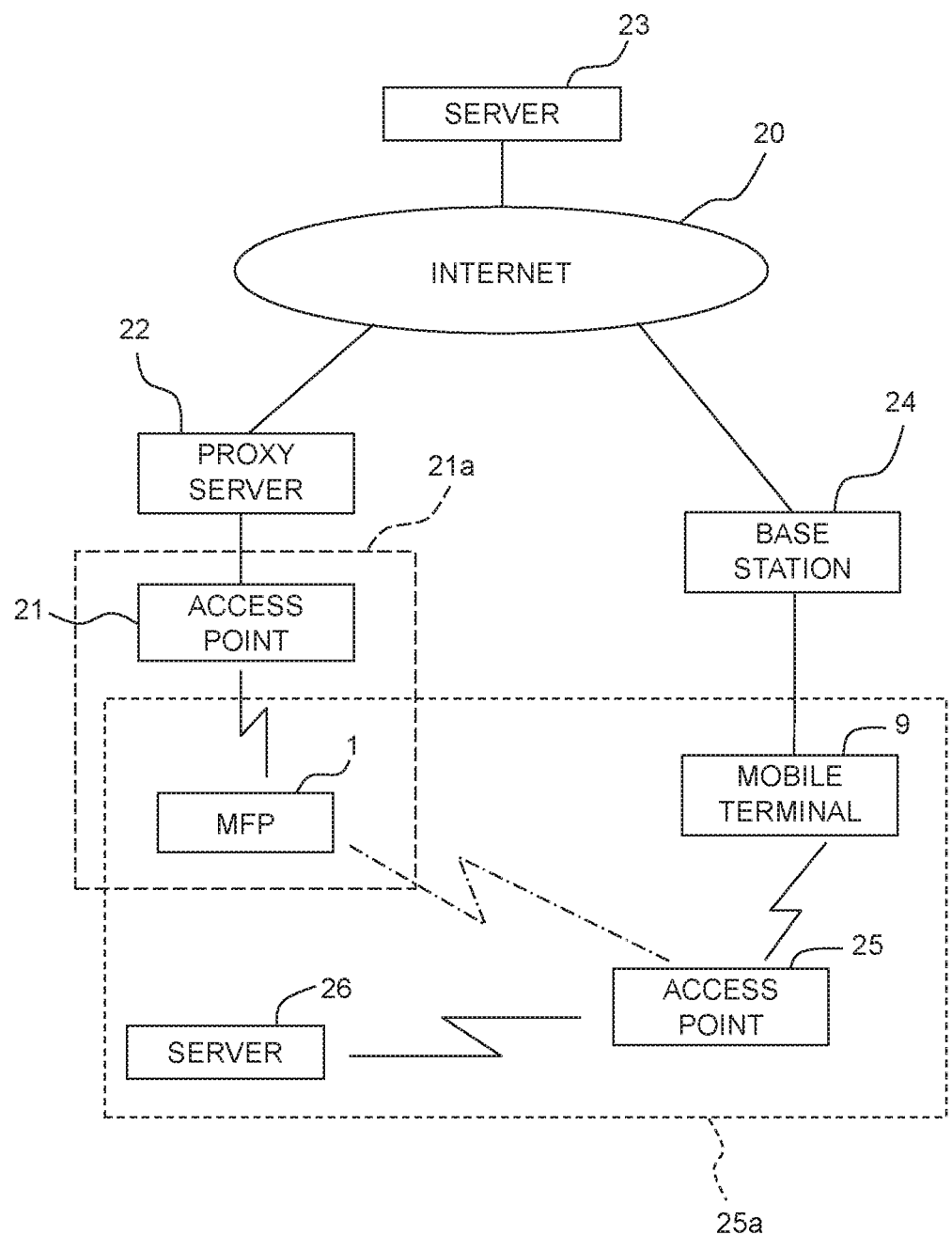
FIG. 2 is a view schematically depicting a system to which the multi-function peripheral depicted in FIG. 1 is connected.

Further, as depicted with alternate long and short dashes lines in FIG. 2, the network communicating part 4 establishes the wireless LAN communication with respect to an access point 25 and exchanges IP addresses between the multi-function peripheral 1 and the access point 25, to thereby become data-communicable, via the access point 25, with a mobile terminal 9 in which the wireless LAN communication is similarly established between the mobile terminal 9 and the access point 25. Note that a network 25a is constructed of devices or apparatuses including the mobile terminal 9 and connected to the access point 25. Note that a server 26 is provided in the network 25a. In the present embodiment, in a case that the mobile terminal 9 and the multi-function peripheral 1, each of which establishes the wireless LAN communication between itself and the access point 25, have already obtained information regarding the URL or the local address IP of the server 26, the mobile terminal 9 and the multi-function peripheral 1 become data communicable with the server 26.

The facsimile communicating part 5 is configured to transmit image data to another facsimile machine or device by a FAX communication via the telephone line or internet line. The operating part 6 is provided with three physical buttons which are a selection button 6a, a start button 6b and a power source button 6c. Note that the physical buttons provided on the multi-function peripheral 1 are only the three buttons which are the selection button 6a, the start button 6b and the power source button 6c of the operating part 6.

The selection button 6a is a button via which a user inputs an instruction as to whether an outputting processing is executed via which one of output modes that are a print mode for performing recording of an image on a paper sheet by the printer 3 and a FAX mode for transmitting image data by the facsimile communicating part 5. Namely, for example, the selection button 6 is set by default to the print mode, and the output mode can be switched between the FAX mode and the print mode every time the selection button 6a is pressed or pushed.

The start button 6b is an input button via which the user inputs an instruction for executing the outputting processing in the output mode selected by the selection button 6a. More specifically, an outputting instruction (to be described in detail later on) from an external device or apparatus (the mobile terminal 9 or the server 23, 26 in the present embodiment) is received, and an instruction is given, via the start button 6a, so as to execute the outputting processing based on the received outputting instruction. The power source button 6c is a button via which the user inputs a switching instruction of switching ON/OFF of the power source of the multi-function peripheral 1.

The multi-function peripheral 1 of the present embodiment is capable of instructing to record an image on a paper sheet by the printer 3 or to transmit image data by the facsimile communicating part 5, by using the mobile terminal 9 which is exemplified, for example, by a smartphone, a PDA (Personal Digital Assistant), etc. An application for operating the multi-function peripheral 1 is installed in the mobile terminal 9 in advance.

Figure 3:
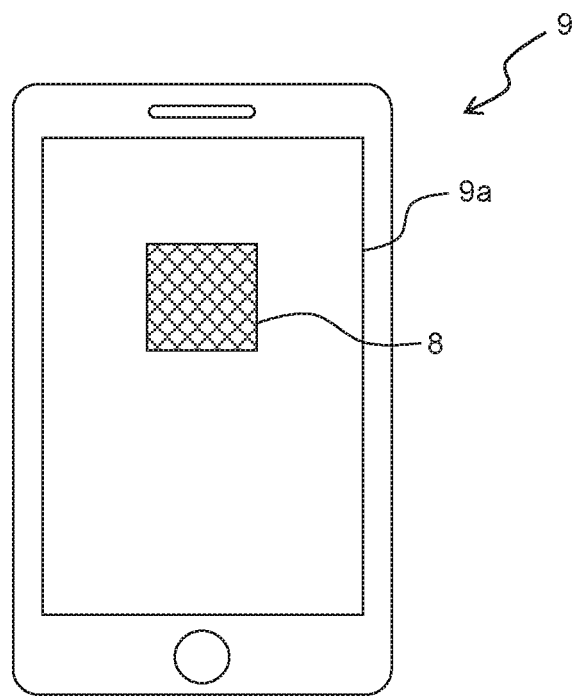
FIG. 3 is a view depicting a mobile terminal provided with a display on which a two-dimensional code, readable by a scanner depicted in FIG. 1, is displayed.

The multi-function peripheral 1 is capable of reading, with the scanner 2, a two-dimensional code 8 displayed on a display 9a of the mobile terminal 9 by an application as depicted in FIG. 3, to thereby obtain information indicated by the two-dimensional code 8. Note that the mobile terminal 9 is connectable to the internet 20 via a base station 24, as depicted in FIG. 2. Accordingly, the mobile terminal 9 which has already obtained the URL of the server 23 is data communicable with the server 23 connected to the internet 20, as depicted in FIG. 2. Further, the mobile terminal 9 is connected to the network 25a as described above, and the mobile terminal 9 which has already obtained the URL or the local IP address of the server 26 is data communicable with the server 26 in the network 25a.

Here, an explanation will be given about the information indicated by the two-dimensional code 8 displayed on the display 9a of the mobile terminal 9. The information indicated by the two-dimensional code 8 includes network information regarding a communication performed by the network communicating part 4 and terminal identification information as identification information of the mobile terminal 9. In the present embodiment, two kinds of information are included as the network information. First network information of the two kinds of the network information is (includes) network identification information for identifying a network to which the mobile terminal 9 is connected (in the example depicted in FIG. 2, the network 25a), and a password for connection to the network. The network identifying information is, for example, SSID (Service Set Identifier). Second network information of the two kinds of the network information is (includes) position information on the internet 20 of the server 23 or position information on the network 25a of the server 26. The position information is, for example, URL. Note that the server 23 or the server 26 stores therein intermediate data for intermediating transfer or delivery of data (data transfer or data delivery) between the mobile terminal 9 and the multi-function peripheral 1. Further, the terminal identification information is, for example, an IP address or MAC address.

The multi-function peripheral 1 is capable of obtaining the network information and the terminal identification information by reading the two-dimensional code 8 with the scanner 2. Based on the network identification information and the password included in the obtained network information, the multi-function peripheral 1 connects to the network 25a to which the mobile terminal 9 is connected, and transmits self-identification information (for example, an IP address) which is identification information of itself (the multi-function peripheral 1), with the mobile terminal 9 which is a device or apparatus having the terminal identification information being a recipient (target of transmittance) of the self-identification information. Afterwards, the multi-function peripheral 1 receives the terminal identification information (for example, the IP address) which is identification information of the mobile terminal 9 and which is transmitted by the mobile terminal 9. Accordingly, this makes it possible to establish communication between the multi-function peripheral 1 and the mobile terminal 9. Further, in a case that the communication between the multi-function peripheral 1 and the mobile terminal 9 is established, the multi-function peripheral 1 is capable of receiving the outputting instruction directly form the mobile terminal 9.

Further, based on the position information of the server 23 or the server 26 obtained by the reading of the two-dimensional code 8, the multi-function peripheral 1 transmits the self-identification information (for example, the MAC address), as information addressed to the mobile terminal 9 as the device or apparatus having the terminal identification information (for example, the MAC address), to the server 23 or the server 26 indicated by the position information. Afterwards, the server 23 or the server 26 transmits the self-identification information of the multi-function peripheral 1 to the mobile terminal 9, thereby allowing the multi-function peripheral 1 to transfer or deliver data between itself and the mobile terminal 9 via the server 23 or the server 26. With this, the multi-function peripheral 1 is capable of receiving the outputting instruction recorded (stored) in the intermediate data stored in the server 23 or the server 26.

Note that the outputting instruction is for instructing the recording of an image on a paper sheet by the printer 3 or the transmittance of image data by the facsimile part 5, and includes the image data and setting information regarding the output. The setting information is output setting data which is a parameter relating an output setting item regarding the recording of an image in the printer 3, or an output setting item regarding transmittance of the image data in the facsimile communicating part 5.

Here, the output setting item regarding the recording of image in the printer 3 includes, for example, "papers sheet size", "number of sheets for which printing is to be performed", "color or monochrome", "page combination (page aggregation)", etc. Further, the output setting item regarding the transmittance of image data in the facsimile communication part 5 includes, for example, "communication image quality", "color or monochrome", "telephone number of transmittance destination", etc.

The user inputs the output setting data to the mobile terminal 9 by using an application software. Namely, in a case of performing the recording of an image, the user inputs, for example, "A4", "10 sheets", "color", and "2 in 1" as parameters relating to the "paper sheet size", the "number of sheets for which printing is to be performed", the "color or monochrome" and the "page combination (page aggregation)", respectively. Further, in a case of performing the transmittance of image data, the user inputs, for example, "high quality" and "monochrome" as parameters relating to the "communication image quality" and the "color or monochrome", respectively. Furthermore, the user inputs a telephone number of a predetermined number of digits (figures) as the "telephone number of destination".

Moreover, the information indicated by the two-dimensional code 8 includes order information regarding application of the network identification information and the position information. In a case that the order information defines that the network identification information is to be applied prior to the position information, the multi-function peripheral 1 transmits the self-identification information, with the mobile terminal 9 as the device having the terminal identification information being a recipient of the self-identification information, via the network 25a identified by the network identification information, unless the multi-function peripheral 1 is connected to another network which is different from the network indicated by the obtained network identification information. Further, in a case that the order information defines that the position information is to be applied prior to the network identification information, the multi-function peripheral 1 transmits the self-identification information as the information addressed to the mobile terminal 9 as the device having the terminal identification information, to the server 23 or the server 26 indicated by the position information, unless the multi-function peripheral 1 is not connected to the internet 20.

Figure 4A:
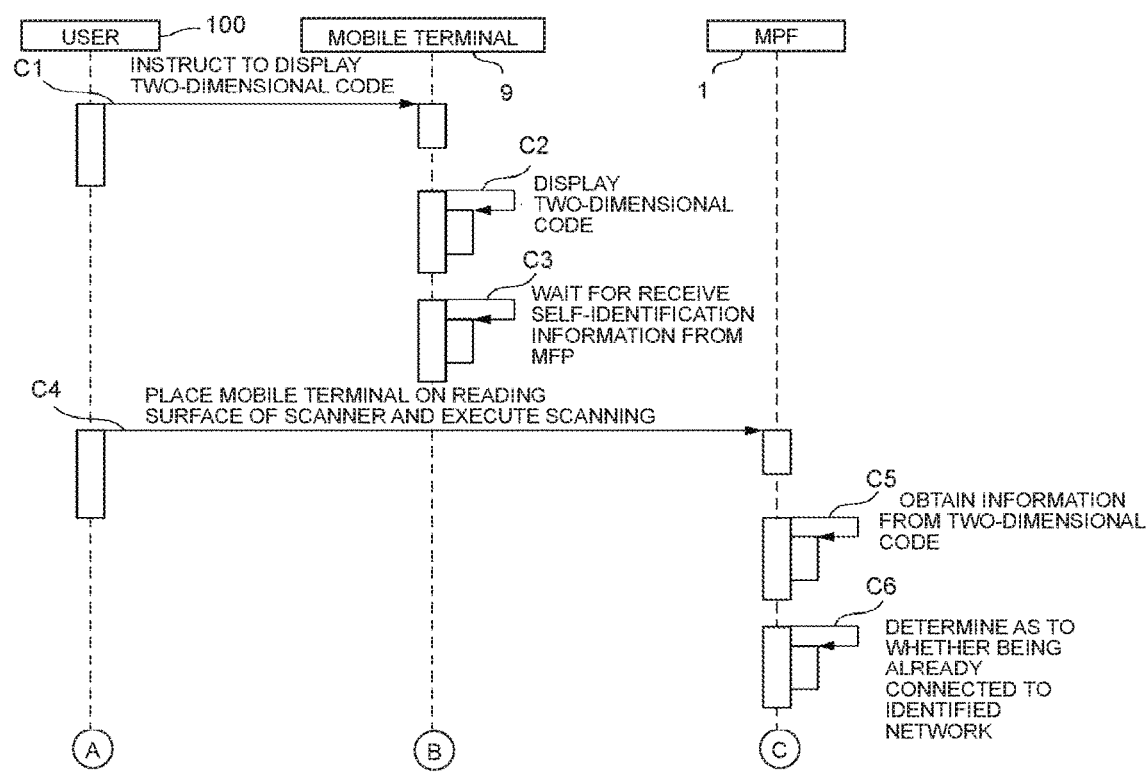
FIGS. 4A and 4B depict a sequence diagram of a case of executing an outputting processing based on an outputting instruction received from the mobile terminal.
Figure 4B:
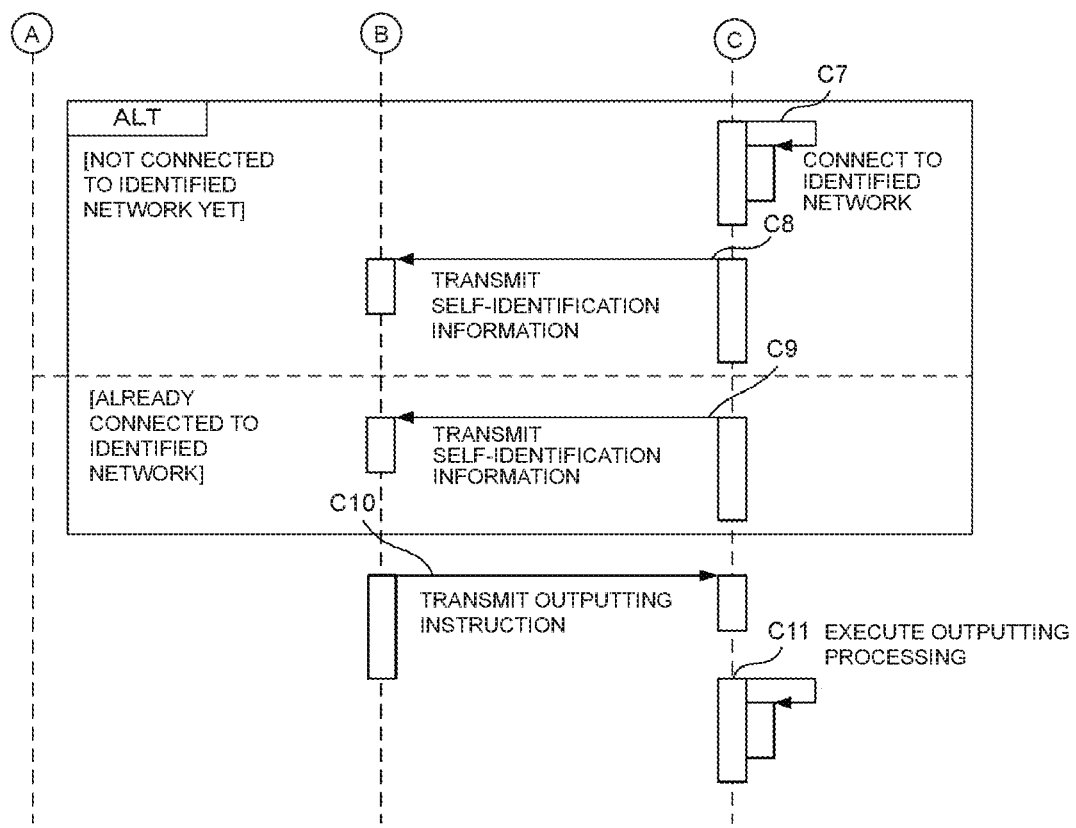

An explanation will be given about the flow of a main processing performed among a user 100, the mobile terminal 9 and the multi-function peripheral 1 in a case of executing the outputting processing based on the outputting instruction received from the mobile terminal 9, with reference to FIGS. 4A and 4B. Note that "ALT" in FIGS. 4A and 4B is a fragment indicating a branching processing.

Firstly, the user 100 operates the mobile terminal 9 and instructs the mobile terminal 9 to display the two-dimensional code 8 on the display 9a (C1). Next, the mobile terminal 9 displays the two-dimensional code 8 on the display 9a (C2). Then, the mobile terminal 9 waits to receive, from the multi-function peripheral 1, the self-identification information as the identification information of the multi-function peripheral 1 itself (C3).

Afterwards, the user 100 places the mobile terminal 9 on a reading surface (not depicted in the drawings) of the printer 3 of the multi-function peripheral 1, in a state that the two-dimensional code 8 is displayed on the display 9a, and executes scanning (C4 (reading processing)). The controller 10 of the multi-function peripheral 1 obtains information from the two-dimensional code 8 read by the scanning of step C4 (C5 (information obtaining processing)). Further, the controller 10 of the multi-function peripheral 1 determines whether the multi-function peripheral 1 is already connected to the network 25a identified by the network identification information included in the information obtained in step C5 (C6 (connection confirming processing)).

Further, in a case that the multi-function peripheral 1 is not connected to the network 25a yet, the controller 10 of the multi-function peripheral 1 controls the network communicating part 4, by using the password included in the information obtained in step C5, to thereby connect the multi-function peripheral 1 to the network 25a (C7 (connecting processing)). Afterwards, the controller 10 of the multi-function peripheral 1 controls the network communicating part 4 so as to transmit, via the network 25a to which the multi-function peripheral 1 is connected in step C7, the self-identification information with the mobile terminal 9 as the device having the terminal identification information included in the information obtained in step C5 being the recipient of the self-identification information (C8 (information notifying processing)). On the other hand, in a case that the multi-function peripheral 1 is already connected to the network 25a, the controller 10 of the multi-function peripheral 1 controls the network communicating part 4 so as to transmit, via the network 25a to which the multi-function peripheral 1 is already connected, the self-identification information with the mobile terminal 9 as the device having the terminal identification information included in the information obtained in step C5 being the recipient of the self-identification information (C9 (information notifying processing)). The mobile terminal 9 is notified of the self-identification information of the multi-function peripheral 1 by the step C8 or C9, thereby establishing the communication between the multi-function peripheral 1 and the mobile terminal 9.

Afterwards, the mobile terminal 9 transmits the outputting instruction with the multi-function peripheral 1, as the device having the self-identification information transmitted in step C8 or C9, being the recipient of the outputting instruction (C10). Then, the multi-function peripheral 1 executes the outputting processing of performing recording of an image or transmittance of image data, based on the outputting instruction transmitted from the mobile terminal 9 in step C10 (C11).

Figure 5A:
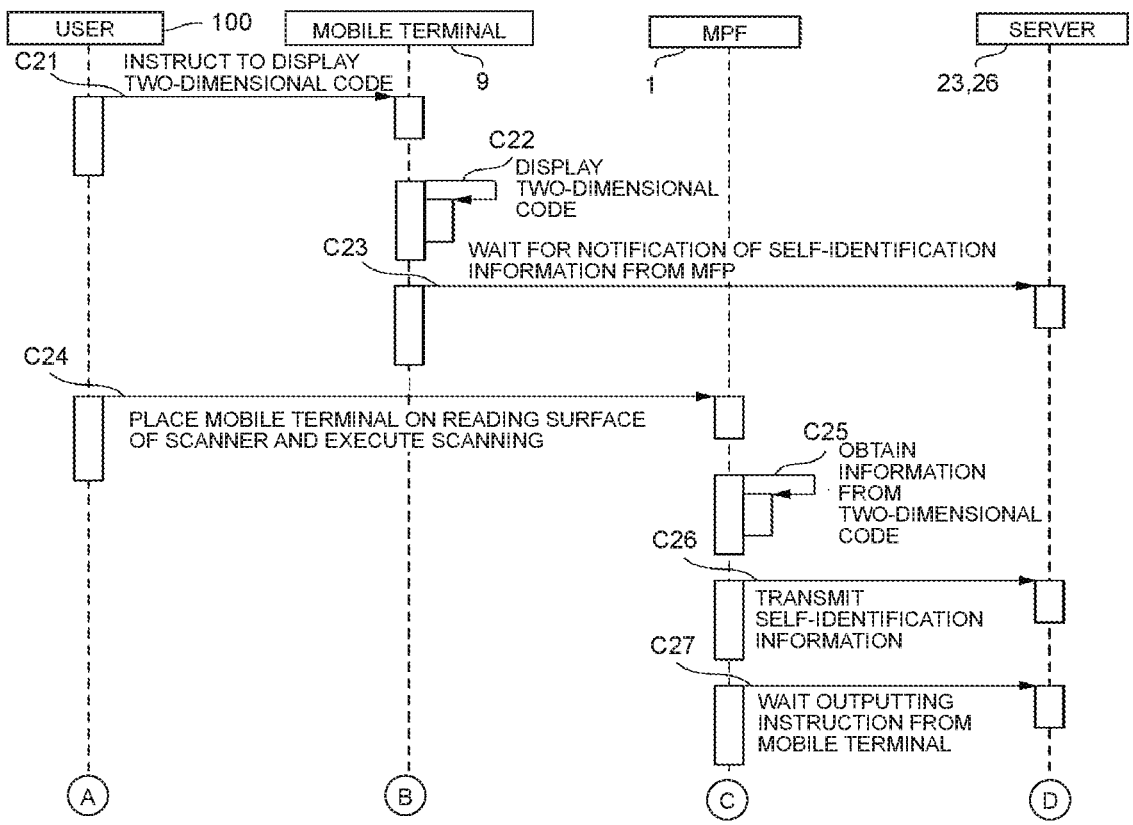
FIGS. 5A and 5B depict a sequence diagram of a case of executing the outputting processing based on an outputting instruction received from a server.
Figure 5B:
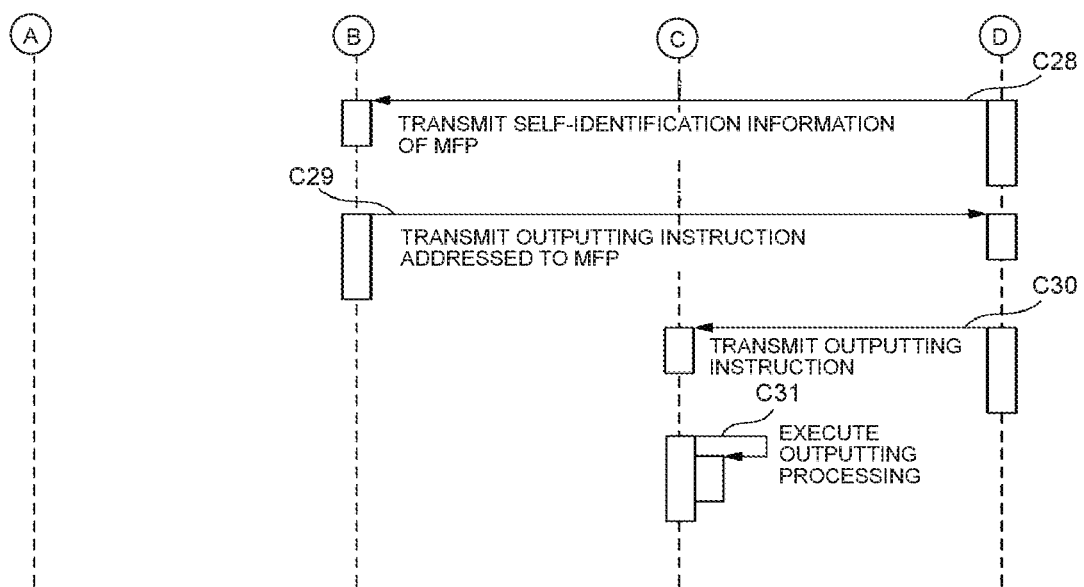

Next, an explanation will be given about the flow of a main processing performed among the user 100, the mobile terminal 9, the multi-function peripheral 1 and the server 23, 26 in a case of executing the outputting processing based on the outputting instruction received from the server 23 or the server 26, with reference to FIGS. 5A and 5B.

Firstly, the user 100 operates the mobile terminal 9 and instructs the mobile terminal 9 to display the two-dimensional code 8 on the display 9a (C21). Next, the mobile terminal 9 displays the two-dimensional code 8 on the display 9a (C22). Then, the mobile terminal 9 starts monitoring as to whether or not information addressed to a device having the terminal identification information of the mobile terminal 9 is recorded in the intermediate data of the server 23 or server 26, and the mobile terminal 9 waits for being notified of the self-identification information caused by recording of the self-identification information of the multi-function peripheral 1 in the intermediate data stored in the server 23 or server 26 (C23). Note that the monitoring is performed by a following manner: firstly, the mobile terminal 9 notifies the server 23 or server 26 of the terminal identification information (for example, the MAC address) of the mobile terminal 9 itself, and, as an example, the mobile terminal 9 confirms as to whether the information addressed to a device having the terminal identification information is recorded in the intermediate data at a predetermined time interval. In a case that the IP address of the mobile terminal 9 is not fixed and varies, such as a variable IP address, the mobile terminal 9 is capable of notifying the server 23 or server 26 of the IP address of the mobile terminal 9 itself at every time the mobile terminal 9 makes the confirmation as to the presence or absence of the above-described recording in the intermediate data. Afterwards, the user 100 places the mobile terminal 9, in a state that the two-dimensional code 8 is displayed on the display 9a, on a reading surface (not depicted in the drawings) of the printer 3 of the multi-function peripheral 1 and executes scanning (C24 (reading processing)).

The controller 10 of the multi-function peripheral 1 obtains information from the two-dimensional code 8 read in the scanning of step C24 (C25 (information obtaining processing)). Further, the controller 10 of the multi-function peripheral 1 controls the network communicating part 4 so as to transmit the self-identification information (for example, the MAC address), as the information addressed to the mobile terminal 9 which is the device having the terminal identification information included in the information obtained in step C25, to the server 23 or server 26 indicated by the position information included in the information obtained in step C25 (C26 (information notifying processing). Afterwards, the controller 10 of the multi-function peripheral 1 waits the outputting instruction from the mobile terminal 9 to be recorded in the intermediate data stored in the server 23 or server 26 (C27 (monitoring processing)). The monitoring is performed, as an example, by confirming as to whether the information addressed to a device having the terminal identification information is recorded in the intermediate data at a predetermined time interval. In a case that the IP address of the multi-function peripheral 1 is not fixed and varies, such as a variable IP address, the multi-function peripheral 1 may notify the server 23 or server 26 of the IP address of the multi-function peripheral 1 itself at every time the multi-function peripheral 1 makes the confirmation as to the presence or absence of the above-described recording in the intermediate data. Note that it is allowable to determine that the monitoring processing is an error under a condition that the monitoring processing is continuously performed for a predetermined period of time, and to end the processing.

Further, the server 23 or the server 26 transmits the self-identification information transmitted from the multi-function peripheral 1 in step C26 to the mobile terminal 9 (C28). This makes it possible to transfer data between the multi-function peripheral 1 and the mobile terminal 9 via the server 23 or the server 26. Next, the mobile terminal 9 transmits, to the server 23 or the server 26, the outputting instruction as the information addressed to the multi-function peripheral 1 as a device or apparatus having the self-identification information (C29). In a case that the controller 10 determines, as a result of monitoring performed at the predetermined time interval, that the outputting instruction is included in the intermediate data, the server 23 or 26 outputs the outputting instruction transmitted from the mobile terminal 9 in step C29 to the multi-function peripheral 1 (C30). Further, the multi-function peripheral 1 executes the outputting processing of performing the recording of an image or the transmittance of image data, based on the outputting instruction transmitted from the server 23 or the server 26 in step C30 (C31).

Figure 6B:
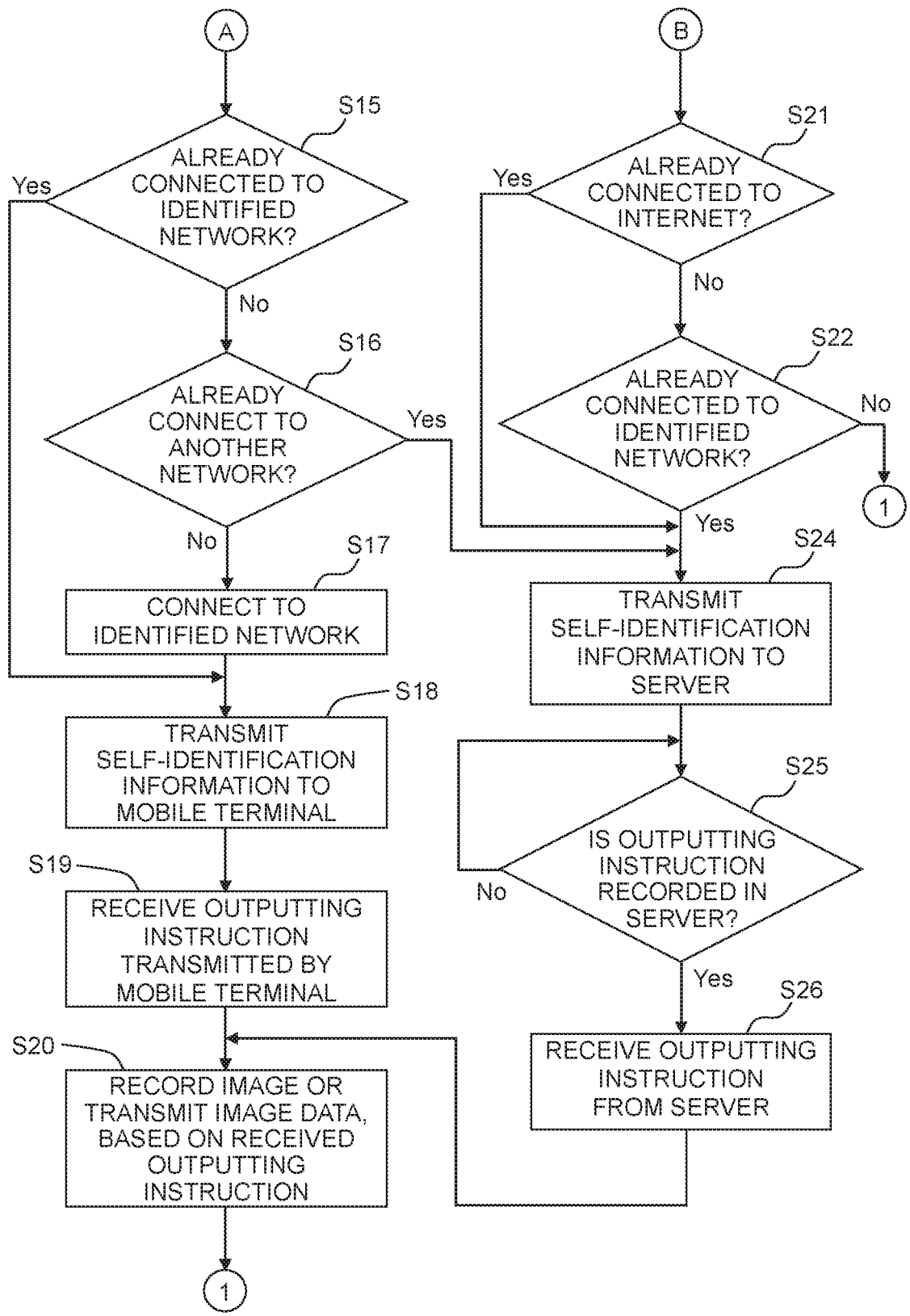

Next, an explanation will be given about the flow of a processing procedure performed in the multi-function peripheral 1 of the present embodiment in a case of executing the recording of an image by the printer 3, or executing the transmittance of image data by the facsimile communicating part 5, based on the outputting instruction received from the external apparatus, with reference to FIGS. 6A and 6B. The processing depicted in FIGS. 6A and 6B is performed during a period of time during which the power source of the multi-function peripheral 1 is switched ON.

Firstly, the controller 10 determines whether or not the start button 6b is pressed (S11). The determination in step S11 is repeated until the controller 10 determines that the start button 6b is pressed. Then, in a case that the controller 10 determines that the start button 6b is pressed (S11: YES), scanning is executed by the scanner 2 so as to read the two-dimensional code 8 displayed on the display 9a of the mobile terminal 9 placed on the reading base (not depicted in the drawings) (S12 (reading processing)). Further, the controller 10 obtains information from the two-dimensional code 8 read in the scanning performed in step S12 (S13 (information obtaining processing)).

Afterwards, the controller 10 determines whether or not the order information included in the information obtained in step S13 defines that the network identification information is to be applied prior to the position information (S14). In a case that the order information defines that the network identification information is to be applied prior to the position information (S14: YES), the controller 10 determines whether or not the multi-function peripheral 1 is already connected to the network 25a identified by the network identification information included in the information obtained in step S13 (S15). In a case that the multi-function peripheral 1 is already connected to the network 25a (S15: YES), the controller 10 proceeds to step S18, while omitting steps S16 and S18 (to be described later on).

On the other hand, in a case that the multi-function peripheral 1 is not connected to the network 25a yet (S15: NO), the controller 10 determines whether or not the multi-function peripheral 1 is connected to another network 21a (see FIG. 2) different from the network 25a (S16 (existing connection determining processing)). In a case that the multi-function peripheral 1 is already connected to the another network 21a (S16: YES), the controller 10 proceeds to step S24 (to be described later on). On the other hand, in a case that the multi-function peripheral 1 is not connected to the another network 21a yet, namely, in a case that the multi-function peripheral 1 is not connected to any network (S16: NO), the controller 10 controls the network communicating part 4 so that the multi-function peripheral 1 is connected to the network 25a by using the password included in the information obtained in step S13 (S17 (connecting processing)).

Afterwards, the controller 10 controls the network communicating part 4 so as to transmit, via the network 25a, the self-identification information, with the mobile terminal 9, which is the device having the terminal identification information included in the information obtained in step S13, being the recipient of the self-identification information (S18 (information notifying processing)). Next, the controller 10 receives the outputting instruction transmitted by the mobile terminal 9 (S19 (outputting instruction receiving processing)). Further, the controller 10 executes the outputting processing so as to perform the recording of an image or the transmittance of image data, based on the outputting instruction received in step S19 (S20). Afterwards, the controller 10 returns to step S11.

On the other hand, in a case that the order information defines that the position information is to be applied prior to the network identification information (S14: NO), the controller 10 determines whether or not the multi-function peripheral 1 is already connected to the internet 20 (S21). In a case that the controller 10 determines that the multi-function peripheral 1 is already connected to the internet 20 (S21: YES), the controller 10 proceeds to step 24. On the other hand, in a case that the controller 10 determines that the multi-function peripheral 1 is not connected to the internet 20 yet (S21: NO), the controller 10 determines whether the multi-function peripheral 1 is already connected to the network 25a identified by the network identification information included in the information obtained in step S13 (S22).

In a case that the controller 10 determines that the multi-function peripheral 1 is not connected to the network 25a yet (S22: NO), the controller 10 ends the processing as an error, and the controller 10 returns to step S11. On the other hand, in a case that the controller 10 determines that the multi-function peripheral 1 is already connected to the network 25a (S22: YES), the controller 10 proceeds to step S24. Then, the controller 10 controls the network communicating part 4 so as to transmit, to the server 23 or the server 26 indicated by the position information included in the information obtained in step S13, the self-identification information as the information addressed to the mobile terminal 9 as the device having the terminal identification information included in the information obtained in step S13

(S24 (information notifying processing)). Note that in a case of "YES" in step S16 or in step S21, the network communicating part 4 transmits the self-identification information to the server 23; in a case of "YES" in step S22, the network communicating part 4 transmits the self-identification information to the server 26.

Next, the controller 10 monitors as to whether or not the outputting instruction from the mobile terminal 9 is recorded in the intermediate data stored in the server 23 or the server 26 (S25). The processing of step S25 is repeated until the controller 10 determines that the outputting instruction from the mobile terminal 9 is recorded in the intermediate data stored in the server 23 or the server 26. Note that in a case that the monitoring processing is performed continuously for a predetermined time period, the controller 10 may end the processing as an error, and may return to step S11. Further, in a case that the controller 10 determines that the outputting instruction is recorded in the intermediate data stored in the server 23 or the server 26 (S25: YES), the controller 10 receives the outputting instruction transmitted from the server 23 or the server 26 (S26 (outputting instruction receiving processing)). Afterwards, the controller 10 proceeds to the above-described step S20. Namely, the controller 10 executes the outputting processing of performing the recording of an image or the transmission of image data based on the outputting instruction received in step S26.

As described above, the controller 10 of the multi-function peripheral 1 of the above-described embodiment controls the scanner 2 so as to read the two-dimensional code 8 displayed on the display 9a of the mobile terminal 9 (step S12 in FIG. 6A (reading processing)). Then, the controller 10 obtains the network information regarding the communication performed by the network communicating part 4, and the terminal identification information as the identification information of the mobile terminal 9 (S13 in FIG. 6A (information obtaining processing)). Further, the controller 10 controls the network communicating part 4 so as to transmit the self-identification information, which is the identification information of the multi-function peripheral 1 itself, as the information addressed to the mobile terminal 9 which is the device or apparatus having the terminal identification information obtained in the information obtaining processing (step S18 or S24 in FIG. 6B (information notifying processing)). Thus, by reading, with the scanner 2, the two-dimensional code 8 displayed on the display 9a of the mobile terminal 9 such as a smartphone, etc., the controller 10 is capable of obtaining the network information regarding the communication performed by the network communicating part 4 and the terminal identification information. Furthermore, the controller 10 is capable of transmitting, based on the obtained network information, the self-identification information, which is the connection information of the multi-function peripheral 1 itself, as the information addressed to the mobile terminal 9 as the device having the terminal identification information. With this, it is possible to notify the mobile terminal 9 of the self-identification information. Thus, even with the multi-function peripheral 1 having such a configuration that no display is provided thereon, it is possible to easily establish the communication between the multi-function peripheral 1 and the mobile terminal 9 and to easily deliver data between the multi-function peripheral 1 and the mobile terminal 9.

Further, in the above-described embodiment, the network information includes the network identification information for identifying the network 25a to which the mobile terminal 9 is connected. In the information notifying processing, the controller 10 controls the network communicating part 4 so as to transmit, via the network 25a having the network identification information, the self-identification information, with the mobile terminal 9 which is the device having the terminal identification information obtained in the information obtaining processing being the recipient of the self-identification processing. Thus, since the mobile terminal 9 and the multi-function peripheral 1 are connected to the same network 25a, even in such a case that the self-identification information and the terminal identification information are, for example, local IP addresses, respectively, it is possible to establish the communication between the multi-function peripheral 1 and the mobile terminal 9 and to directly transmit and receive data between the multi-function peripheral 1 and the mobile terminal 9.

Further, the controller 10 of the above-described embodiment determines whether the multi-function peripheral 1 is connected to the network 25a identified by the network identification information obtained in the information obtaining processing (S15 in FIG. 6B (connection confirming processing)). Further, after the controller 10 has confirmed in the connection confirming processing that the multi-function peripheral 1 is connected to the network 25a, the controller 10 executes the information notifying processing. Accordingly, in a case that the multi-function peripheral 1 is already connected to the same network 25a to which the mobile terminal 9 is also connected, it is possible to use the network 25a.

In addition, in a case that the controller 10 of the multi-function peripheral 1 of the above-described embodiment determines in the connection confirming processing that the multi-function peripheral 1 is not connected to the network 25a, the controller 10 controls the network communicating part 4 so as to connect the multi-function peripheral 1 to the network 25a (step S17 in FIG. 6B (connecting processing)). Further, after the connecting processing, the controller 10 executes the information notifying processing. Accordingly, even in such a case that the multi-function peripheral 1 is not connected to the same network 25a to which the mobile terminal 9 is also connected, it is possible to allow the multi-function peripheral 1 to be connected to the same network 25a to which the mobile terminal 9 is also connected.

Furthermore, in a case that the controller 10 of the multi-function peripheral 1 of the above-described embodiment determines in the connection confirming processing that the multi-function peripheral 1 is not connected to the network 25a, the controller 10 determines whether or not the multi-function peripheral 1 is connected to the another network 21a which is different from the network 25a (step S16 in FIG. 6B (existing connection determining processing)). Further, in a case that the controller 10 determines in the existing connection determining processing that the multi-function peripheral 1 is not connected to the another network 21a, the controller 10 controls, in the connecting processing, the network communicating part 4 so that the multi-function peripheral 1 is connected to the network 25a. Accordingly, in such a case that the multi-function peripheral 1 is already connected to the another network 21a, it is possible to prevent the communication setting from being changed.

Moreover, in the above-described embodiment, the network information includes the network identification information and the password for the connection to the network 25a. In the connecting processing, the controller 10 controls the network communicating part 4 by using the password obtained in the information obtaining processing so as to connect the multi-function peripheral 1 to the network 25a.

Accordingly, even in such a case that it is not possible to input the password by using the mechanical configuration of the multi-function peripheral 1, such as a button, a touch panel, etc., it is possible to allow the multi-function peripheral 1 to be connected to the network 25*a* which is protected by the password.

In addition, in the above-described embodiment, after the controller 10 has performed the information notifying processing, the controller 10 controls the network communicating part 4 so as to receive the outputting instruction transmitted by the mobile terminal 9, with the multi-function peripheral 1 which is the apparatus or device having the self-identification information being the recipient of the outputting instruction (step S19 in FIG. 6B (outputting instruction receiving processing). Namely, it is possible to quickly perform the outputting of image data.

Further, in the above-described embodiment, the network information includes the position information on the internet 20 of the server 23 having the intermediate data stored therein, the intermediate data being for intermediating transfer or delivery of data between the mobile terminal 9 and the multi-function peripheral 1. Then, in the information notifying processing, the self-identification information, as the information addressed to the mobile terminal 9 having the terminal identification information, is transmitted to the server 23 indicated by the position information. Accordingly, even in such a case that the multi-function peripheral 1 is connected to the network 21*a* which is different from the network to which the mobile terminal 9 is connected and that the multi-function peripheral 1 is not capable of communicating directly with the mobile terminal 9, it is possible to allow the multi-function peripheral 1 to transfer or deliver data between itself and the mobile terminal 9, without changing the connection setting of the multi-function peripheral 1 with respect to the network 21*a*.

Furthermore, after the controller 10 of the multi-function peripheral 1 of the above-described embodiment has performed the information notifying processing, the controller 10 controls the network communicating part 4 so as to monitor as to whether the outputting instruction, transmitted by the mobile terminal 9 as the information addressed to the multi-function peripheral 1 which is the apparatus or device having the self-identification information, is recorded in the intermediate data stored in the server 23 or the server 26 (step S25 in FIG. 6B (monitoring processing)). Moreover, in a case that the controller 10 determines in the monitoring processing that the outputting instruction is recorded in the intermediate data, the controller 10 controls the network communicating part 4 so as to receive the outputting instruction (step S26 in FIG. 6B (outputting instruction receiving processing)). Accordingly, it is possible to quickly execute the outputting processing based on the outputting instruction for outputting the image data from the mobile terminal 9.

In addition, the controller 10 of the multi-function peripheral 1 of the above-described embodiment further obtains, in the information obtaining processing, the order information regarding the application of the network identification information and the position information. Further, in a case that the order information defines that the network identification information is to be applied prior to the position information, the self-identification information, with the mobile terminal 9 which is the device having the terminal identification information obtained in the information obtaining processing being the recipient of the self-identification information, is transmitted via the network 25*a* in the information notifying processing, unless the multi-function peripheral 1 is already connected to the another network 21*a* which is different from the network 25*a* which is identified by the network identification information obtained in the information obtaining processing. On the other hand, in a case that the order information defines that the position information is to be applied prior to the network identification information, the self-identification information as the information addressed to the mobile terminal 9 having the terminal identification information is transmitted, in the information notifying processing, to the server 23 or the server 26 indicated by the position information, unless the multi-function peripheral 1 is not connected to the network. Thus, it is possible to reflect the desire of the user in the order information.

In the foregoing, although the embodiment of the present disclosure has been explained based on the drawings, the specific configuration should be considered as not being limited to or restricted by the embodiment as described above. The range of the present disclosure is indicated by the claims, rather than the above-described explanation of the embodiment; further, the range of the claims and any equivalents thereof and any change within the range of the claims are encompassed in the present disclosure.

In the above-described embodiment, the explanation has been given about the case of transmitting, to the mobile terminal 9, the self-identification information of the multi-function peripheral 1 via the network 25 which is constructed of the devices and apparatuses including the mobile terminal 9 and connected to the access point 25. The present disclosure, however, is not limited to or restricted by this. In the information notifying processing, the self-identification information may be transmitted to the mobile terminal 9 via a network connecting the multi-function peripheral 1 and the mobile terminal 9 directly to each other, not via the access point 25.

Further, in the above-described embodiment, the network information includes the network identification information and the password for the connection to the network 25*a*. Further, the explanation has been given about the case wherein the password obtained in the information obtaining processing is used in the connecting processing of the connection to the network 25*a*. The present disclosure, however, is not limited to this. Namely, it is allowable that the network information does not include the password.

Furthermore, in the above-described embodiment, the explanation has been given about such a case that the order information defines that the position information is to be applied prior to the network identification information (step S14: NO in FIG. 6B) and that it is determined that the multi-function peripheral 1 is not connected to the internet 20 yet (step S21: NO in FIG. 6B), then it is determined whether the multi-function peripheral 1 is connected to the network 25*a* (step S22 in FIG. 6B). The present disclosure, however, it not limited or restricted to this. Namely, in a case that it is determined that the multi-function peripheral 1 is not connected to the internet 20 yet, it is allowable to end the processing and return to step S11.

In addition, in the above-described embodiment, the explanation has been given about such a case that after the self-identification information, as the information addressed to the mobile terminal 9 is transmitted to the server 23 or the server 26 (step S24 in FIG. 6B), the monitoring is made as to whether or not the outputting instruction is recorded in the intermediate data stored in the server 23 or the server 26 (step S25 in FIG. 6B). The present disclosure, however, is not limited to this. Namely, for example, in such a case that the self-identification information or information which is different from the self-identification information and which is transmitted from the multi-function peripheral 1 as the address of the multi-function peripheral 1 is unchangeable (fixed) such as a fixed IP address or a mail address, it is allowable that the server 23 or the server 26 automatically transmits, to the multi-function peripheral 1, data which is transmitted from the mobile terminal 9.

Further, in the above-described embodiment, the explanation has been given about such a case that the two-dimensional code 8 displayed on the display 9a of the mobile terminal 9 includes the order information regarding the application of the network identification information and the position information and that the order information is obtained in the information obtaining processing. The present disclosure, however, is not limited to this. Namely, for example, it is allowable that the two-dimensional code 8 includes selection information regarding which one of the network identification network and the position information is to be applied, and that the selection information is obtained in the information obtaining processing.

Figure 7A:
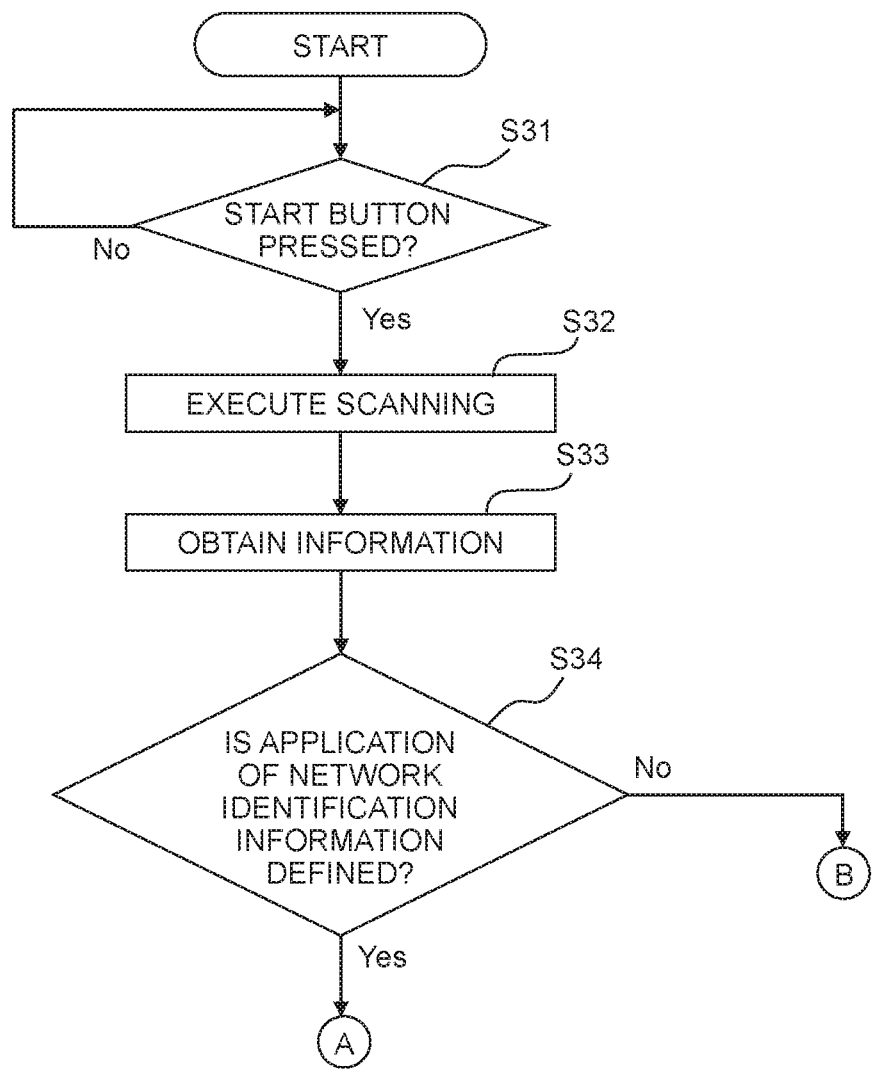
FIGS. 7A and 7B depict a flowchart depicting another example of the processing procedure executed by the controller of the multi-function peripheral depicted in FIG. 1.
Figure 7B:
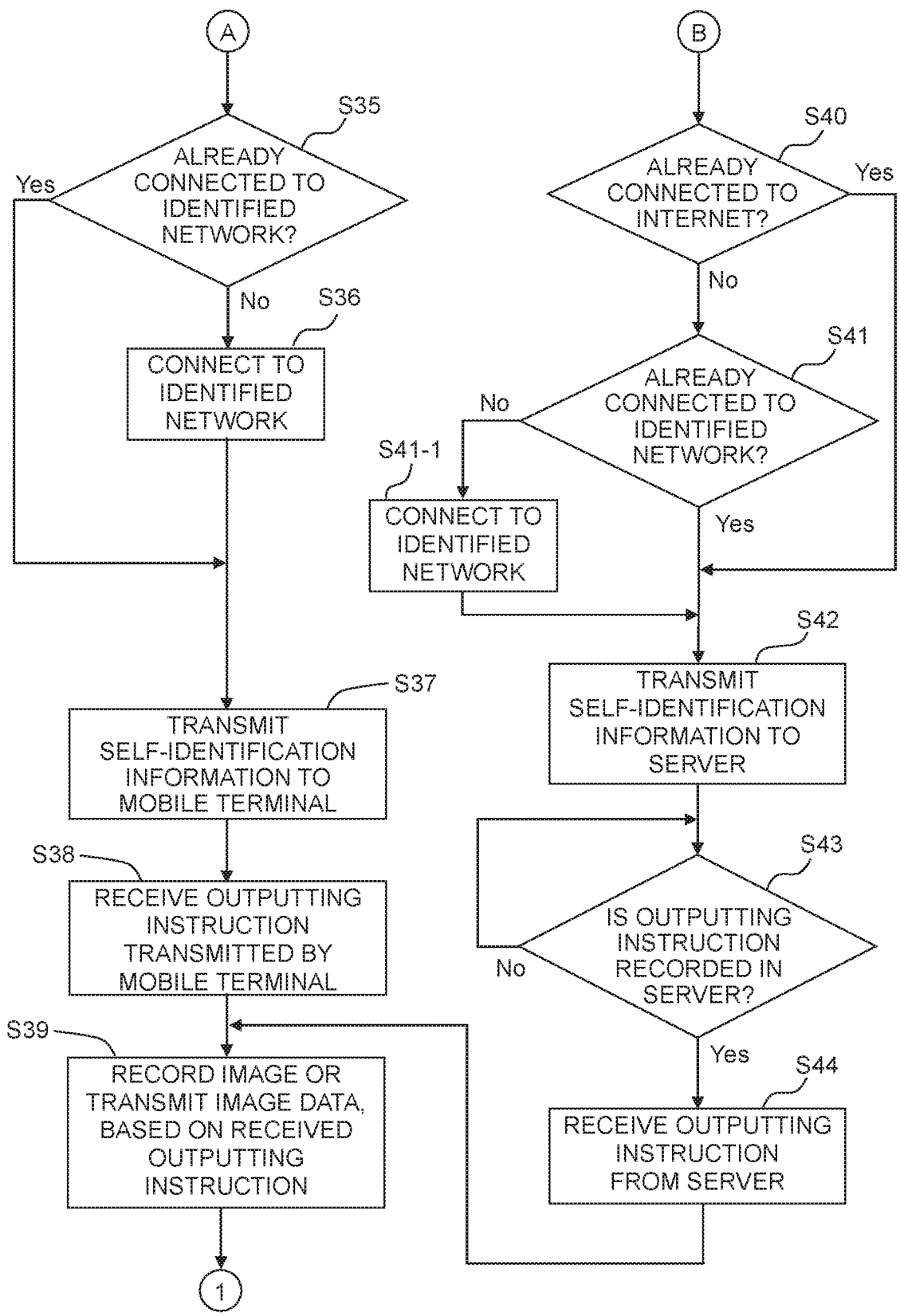

An explanation will be given about an example of a processing procedure performed in the multi-function peripheral 1 in a case of obtaining the selection information in the information obtaining processing, with reference to FIGS. 7A and 7B. Processings in steps S31 to S33 correspond to the processings in the steps S11 to S13, respectively, as depicted in FIG. 6A, and thus any explanation therefor will be omitted.

The controller 10 determines whether or not the selection information included in the information obtained in step S33 defines that the network identification information is to be applied (step S34). In a case that the selection information defines that the network identification information is to be applied (step S34: YES), the controller 10 determines whether the multi-function peripheral 1 is already connected to the network 25a identified by the network identification information included in the information obtained in step S33 (S35). In a case that the multi-function peripheral 1 is already connected to the network 25a (S35: YES), the controller 10 skips step S36 (to be described later on), and the controller 10 proceeds to step S37. On the other hand, in a case that the multi-function peripheral 1 is not connected to the network 25a yet (step S35: NO), the controller 10 controls the network communicating part 4 so as to connect the multi-function peripheral 1 to the network 25a by using the password included in the information obtained in step S33 (step S36 (connecting processing)). In this situation, even if the multi-function peripheral 1 is connected to the network 21a, the connection between the multi-function peripheral 1 and the network 21a is consequently canceled. Processings in steps S37 to S39 after step S36 correspond to the processings in the steps S18 to S20, respectively, as depicted in FIG. 6B, and thus any explanation therefor will be omitted.

Further, in step S34, in a case that the order information or the selection information defines that the position information is to be applied (step S34: NO), the controller 10 determines whether or not the multi-function peripheral 1 is already connected to the internet 20 (step S40). In a case that the controller 10 determines that the multi-function peripheral 1 is already connected to the internet 20 (step S40: YES), the controller 10 skips steps S41 and S41-1 (to be described later on), and proceeds to step S42. On the other hand, in a case that the controller 10 determines that the multi-function peripheral 1 is not connected to the internet 20 yet (step S40: NO), the controller 10 determines whether the multi-function peripheral 1 is already connected to the network 25a identified by the network identification information included in the information obtained in step S33 (step S41). In a case that the controller 10 determines that the multi-function peripheral 1 is already connected to the network 25a (step S41: YES), the controller 10 proceeds to step S42. On the other hand, in a case that the controller 10 determines that the multi-function peripheral 1 is not connected to the network 25a yet (step S41: NO), the controller 10 controls the network communicating part 4 so as to connect the multi-function peripheral 1 to the network 25a by using the password included in the information obtained in step S33 (41-1 (connecting processing)), and the controller 10 proceeds to step S42. By the control of the network communicating processing 4 performed by the controller 10 so as to connect the multi-function peripheral 1 to the network 21a, the multi-function peripheral 1 is allowed to be connected to the internet 20 (step S41). Processings in steps S42 to S44 after step S41 correspond to the processings in the steps S24 to S26, respectively, as depicted in FIG. 6B, and thus any explanation therefor will be omitted. Note that in the information notifying processing in step S42, in a case of "YES" in step S40, the self-identification information is transmitted to the server 23; in a case of "YES" in S41, the self-identification information is transmitted to the server 26.

As described above, in the case that the selection information defines that the network identification information is to be applied, then in the information notifying processing, the controller 10 of the multi-function peripheral 1 transmits the self-identification information, with the mobile terminal 9 which is the device having the terminal identification information being the recipient of the self-identification, via the network 25a having the network identification information. On the other hand, in the case that the selection information defines that the position information is to be applied, then in the information notifying processing, the controller 10 of the multi-function peripheral 1 transmits the self-identification information as the information addressed to the mobile terminal 9 which is the device having the terminal identification information, to the server 23 or the server 26 indicated by the position information. In this modification, it is possible to reflect the desire of the user in the selection information.

Further, in the above-described embodiment, the explanation has been given about such a case that the network communicating part 4 is the interface for performing the wireless LAN communication. The present disclosure, however, is not limited to this. For example, the network communicating part 4 may be an interface for performing a wired LAN communication. Further, the network communicating part 4 may include both of the interface for performing the wireless LAN communication and the interface for performing the wired LAN communication.

Furthermore, in the above-described embodiment, the explanation has been given about such a case that the outputting instruction which is received in the outputting instruction receiving processing includes the image data and the setting information regarding the output. The present disclosure, however, is not limited to this. Namely, for example, it is allowable that the outputting instruction is only the setting information regarding the output, and that the outputting processing is performed based on image data generated or prepared by performing the reading with the scanner 2, image data obtained from a removable memory such as a USB memory or the like, etc. Alternatively, it is allowable that the outputting instruction is only the image data, and that the outputting processing is performed with a default output setting.

In addition, in the above-described embodiment, the explanation has been given about such a case that the network information, the terminal identification information, etc., are displayed by the two-dimensional code 8 on the display 9a of the mobile terminal 9. The present disclosure, however, is not limited to this. It is allowable that the information displayed on the display 9a is displayed by a symbol group displayed by one piece or a plurality of pieces of symbol, including a one-dimensional code or a character string.

Moreover, in the above-described embodiment, the explanation has been given about such a case that the network information indicated by the two-dimensional code 8 includes both of the network identification information and the position information. The present disclosure, however, is not limited to this. The network information may be any one of the network identification information and the position information.

Further, in the above-described embodiment, the explanation has been given about such a case that the multi-function peripheral 1 is capable of belonging to any one of the two networks 21a and 25a. The present disclosure, however, is not limited to this. Namely, the network to which the multi-function peripheral 1 is capable of belonging may be one network, or not less than three networks.

Furthermore, in the above-described embodiment, the explanation has been given about such a case that the server 26 is present in the network 25a to which the mobile terminal 9 belongs. The present disclosure, however, is not limited to this. It is allowable that the server 26 is not present in the network 25a.

Moreover, in the above-described embodiment, the explanation has been given about such a case that the present disclosure is applied to the multi-function peripheral 1 having the printing function, the scanner function and the FAX function. The present disclosure, however, is not limited to this. Namely, the present disclosure is applicable also to a multi-function peripheral having no FAX function, or to an apparatus having only the scanner function and the FAX function. Further, the present disclosure is applicable also to a single printer. For example, a printer 1a depicted in FIG. 8 is connected to a scanner 200 as an external apparatus, via a USB interface 2a. The printer 1a obtains image data prepared or generated by the reading of a two-dimensional code 8 displayed on a display 9a of a mobile terminal 9 performed by the scanner 200, and executes an obtaining processing of obtaining information such as the network information, the terminal identifying information, etc., from the obtained image data.

In addition, in the above-described embodiment, the explanation has been given about such a case that the multi-function peripheral 1 is configured such that the multi-function peripheral 1 is not provided with a display and that only the three physical buttons which are the selection button 6a, the start button 6b and the power source button 6c are provided on the multi-function peripheral 1. The present disclosure, however, is not limited to this. The present disclosure is applicable also to a multi-function peripheral and a printer each of which is provided with a display and/or not less than four physical buttons.

What is claimed is:

1. A multi-function peripheral comprising:
 a controller; and
 a scanner of a flat-bed system;
 wherein the controller is configured to:
  control the scanner to scan an image displayed on a display of a mobile terminal;
  obtain both of network information and terminal identification information as identification information of the mobile terminal, from image data generated by the scanning performed by the scanner; and
  control the multi-function peripheral to transmit, based on the obtained network information, self-identification information which is identification information of the multi-function peripheral, as information addressed to a device having the obtained terminal identification information,
 wherein in a case that the network information includes network identification information for identifying a network to which the mobile terminal is connected, but does not include position information of a server on a network, the server storing intermediate data for intermediating data transfer between the mobile terminal and the multi-function peripheral,
  the controller is configured to control the multi-function peripheral to transmit, via a network having the network identification information, the self-identification information, with the device having the obtained terminal identification information being a recipient of the self-identification information, and
 wherein in a case that the network information includes the position information of the server on the network, but does not include network identification information,
  the controller is configured to control the multi-function peripheral to transmit, to the server indicated by the position information, the self-identification information as the information addressed to the device having the obtained terminal identification information.

2. The multi-function peripheral according to claim 1, wherein the controller is configured to determine whether the multi-function peripheral is connected to the network identified by the obtained network identification information, and
 after the controller has determined that the multi-function peripheral is connected to the network, the controller is configured to control the multi-function peripheral to transmit the self-identification information as the information addressed to the device having the obtained terminal identification information.

3. The multi-function peripheral according to claim 1, wherein the controller is configured to:
 determine whether the multi-function peripheral is connected to the network identified by the obtained network identification information;
 in a case that the controller determines that the multi-function peripheral is not connected to the network, control the multi-function peripheral to connect to the network; and
 after the controller has connected the multi-function peripheral to the network, control the multi-function peripheral to transmit the self-identification information as the information addressed to the device having the obtained terminal identification information.

4. The multi-function peripheral according to claim 3, wherein in the case that the controller determines that the multi-function peripheral is not connected to the network, the controller is configured to determine whether the multi-function peripheral is connected to another network which is different from the network; and
 in a case that the controller determines that the multi-function peripheral is not connected to the another network, the controller is configured to control the multi-function peripheral to connect to the network.

5. The multi-function peripheral according to claim 3, wherein in a case that the network information includes the network identification information and a password for connection to the network,
the controller is configured to control the multi-function peripheral to connect to the network by using the password included in the obtained network information.

6. The multi-function peripheral according to claim 1, wherein after the controller has transmitted the self-identification information as the information addressed to the device having the obtained terminal identification information, the controller is configured to control the multi-function peripheral to receive an outputting instruction for outputting image data by the multi-function peripheral, the outputting instruction being transmitted by the mobile terminal with a device having the self-identification information being a recipient of the outputting instruction.

7. The multi-function peripheral according to claim 1, wherein after the controller has transmitted the self-identification information as the information addressed to the device having the obtained terminal identification information, the controller is further configured to control the multi-function peripheral to monitor whether an outputting instruction for outputting the image data is recorded in the intermediate data stored in the server, the outputting instruction being transmitted by the mobile terminal as information addressed to a device having the self-identification information; and in a case that the controller determines that the outputting instruction is recorded in the intermediate data, the controller is further configured to control the multi-function peripheral to receive the outputting instruction.

8. The multi-function peripheral according to claim 1, wherein in a case that the network information includes network identification information for identifying a network to which the mobile terminal is connected and position information of a server on a network, the server storing intermediate data for intermediating data transfer between the mobile terminal and the multi-function peripheral,
the controller is configured to:
obtain order information regarding application of the network identification information and the position information;
in a case that the order information defines that the network identification information is to be applied prior to the position information, control the multi-function peripheral to transmit the self-identification information, with the device having the obtained terminal identification information being a recipient of the self-identification information via the network having the network identification information, unless the multi-function peripheral is connected to another network which is different from the network identified by the obtained network identification information; and
in a case that the order information defines that the position information is to be applied prior to the network identification information, control the multi-function peripheral to transmit the self-identification information as the information addressed to the device having the obtained terminal identification information, to the server indicated by the position information, unless the multi-function peripheral is not connected to any network.

9. The multi-function peripheral according to claim 1, wherein in a case that the network information includes network identification information for identifying a network to which the mobile terminal is connected and position information of a server on a network, the server storing intermediate data for intermediating data transfer between the mobile terminal and the multi-function peripheral,
the controller is configured to:
obtain selection information regarding which one of the network identification network and the position information is to be applied;
in a case that the selection information defines that the network identification information is to be applied, control the multi-function peripheral to transmit the self-identification information, with the device having the obtained terminal identification information being a recipient of the self-identification information, via the network having the network identification information; and
in a case that the selection information defines that the position information is to be applied, control the multi-function peripheral to transmit the self-identification information as the information addressed to the device having the obtained terminal identification information, to the server indicated by the position information.

10. An image recording apparatus comprising:
a controller;
a printer configured to record an image on a recording medium based on image data; and
a connector connected to the controller, the connector being connectable to a scanner of a flat-bed system,
wherein the controller is configured to:
obtain network information regarding communication which is performed by the image recording apparatus and terminal identification information as identification information of a mobile terminal, from image data generated by scanning, by the scanner, of an image displayed on a display of the mobile terminal; and
control the image recording apparatus to transmit, based on the obtained network information, self-identification information which is identification information of the image recording apparatus, as information addressed to a device having the obtained terminal identification information,
wherein in a case that the network information includes network identification information for identifying a network to which the mobile terminal is connected, but does not include position information of a server on a network, the server storing intermediate data for intermediating data transfer between the mobile terminal and the image recording apparatus,
the controller is configured to control the image recording apparatus to transmit, via a network having the network identification information, the self-identification information, with the device having the obtained terminal identification information being a recipient of the self-identification information, and
wherein in a case that the network information includes the position information of the server on the network, but does not include network identification information,
the controller is configured to control the image recording apparatus to transmit, to the server indicated by the position information, the self-identification information as the information addressed to the device having the obtained terminal identification information.

11. The multi-function peripheral of claim 1, wherein the controller is further configured to, wherein in a case that the network information includes network identification information for identifying a network to which the mobile terminal is connected:
- determine whether the multi-function peripheral is connected to the network identified by the obtained network identification information; and
- in a case that the multi-function peripheral is not connected to the network identified by the obtained network identification information, but is connected to another network which is different from the network: performing the control of the multi-function peripheral to transmit the self-identification information as the information addressed to the device having the obtained terminal identification information through a server different from the mobile terminal and the multi-function peripheral.

* * * * *